US012593173B2

(12) United States Patent
Chen et al.

(10) Patent No.: US 12,593,173 B2
(45) Date of Patent: Mar. 31, 2026

(54) SOUND LOCALIZATION METHOD, APPARATUS AND DEVICE

(71) Applicant: Zhejiang Alibaba Robot Co., Ltd., Hangzhou (CN)

(72) Inventors: Weiguang Chen, Hangzhou (CN); Weilong Huang, Hangzhou (CN); Jinwei Feng, Hangzhou (CN)

(73) Assignee: Zhejiang Alibaba Robot Co., Ltd., Hangzhou (CN)

( * ) Notice: Subject to any disclaimer, the term of this patent is extended or adjusted under 35 U.S.C. 154(b) by 87 days.

(21) Appl. No.: 18/684,763

(22) PCT Filed: Sep. 30, 2022

(86) PCT No.: PCT/CN2022/123555
§ 371 (c)(1),
(2) Date: Feb. 19, 2024

(87) PCT Pub. No.: WO2023/056905
PCT Pub. Date: Apr. 13, 2023

(65) Prior Publication Data
US 2025/0008261 A1      Jan. 2, 2025

(30) Foreign Application Priority Data

Oct. 9, 2021     (CN) ........................... 202111173456.4

(51) Int. Cl.
*H04R 3/00* (2006.01)
*G01S 3/80* (2006.01)
(Continued)

(52) U.S. Cl.
CPC ............ *H04R 3/005* (2013.01); *G01S 3/8006* (2013.01); *G10L 15/26* (2013.01); *G10L 15/30* (2013.01); *H04S 7/303* (2013.01)

(58) Field of Classification Search
CPC ....... H04R 3/005; G01S 3/8006; G10L 15/26; G10L 15/30; H04S 7/303; H04M 3/568
(Continued)

(56) References Cited

U.S. PATENT DOCUMENTS

| | | |
|---|---|---|
| 2006/0115103 A1 | 6/2006 | Feng et al. |
| 2010/0054085 A1 | 3/2010 | Wolff et al. |

(Continued)

FOREIGN PATENT DOCUMENTS

| | | |
|---|---|---|
| CN | 103176167 A | 6/2013 |
| CN | 107356943 A | 11/2017 |

(Continued)

OTHER PUBLICATIONS

European Search Report dated Oct. 9, 2024 for European Application No. 22877924.5.

(Continued)

*Primary Examiner* — Thjuan K Addy
(74) *Attorney, Agent, or Firm* — Eschweiler & Potashnik, LLC

(57) ABSTRACT

A conference speech presentation system, a sound localization method and apparatus, a conference system and a pickup device. The method includes the following steps: collecting (S101) a multi-channel voice signal through a directional microphone array; determining (S103) a steering vector including phase information and amplitude information according to array shape information and microphone pointing direction information; determining (S105) sound direction information according to the steering vector and the voice signal. By adopting this processing mode, both the phase information and the amplitude information are considered when determining the steering vector, which can effectively improve the accuracy of sound localization.

20 Claims, 3 Drawing Sheets

(51) Int. Cl.

| | | |
|---|---|---|
| *G10L 15/26* | (2006.01) | |
| *G10L 15/30* | (2013.01) | |
| *H04M 3/56* | (2006.01) | |
| *H04S 7/00* | (2006.01) | |

(58) Field of Classification Search
USPC ........................................ 381/92, 300, 26, 1
See application file for complete search history.

(56) References Cited

U.S. PATENT DOCUMENTS

| | | | |
|---|---|---|---|
| 2014/0003611 A1* | 1/2014 | Mohammad ............. | H04B 3/20 |
| | | | 381/66 |
| 2016/0302006 A1* | 10/2016 | Pandey ................. | H04M 3/568 |
| 2018/0277140 A1 | 9/2018 | Masuda et al. | |
| 2019/0139563 A1* | 5/2019 | Chen ...................... | G06N 3/084 |
| 2020/0349950 A1 | 11/2020 | Yoshioka et al. | |

FOREIGN PATENT DOCUMENTS

| | | |
|---|---|---|
| CN | 108375763 A | 8/2018 |
| CN | 108419168 A | 8/2018 |
| CN | 108630222 A | 10/2018 |
| CN | 109788382 A | 5/2019 |
| CN | 110047507 A | 7/2019 |
| CN | 110049270 A | 7/2019 |
| CN | 111741404 A | 10/2020 |
| CN | 111986692 A | 11/2020 |
| CN | 112558004 A | 3/2021 |
| CN | 112995838 A | 6/2021 |
| CN | 113608167 A | 11/2021 |
| JP | 2010283676 A | 12/2010 |

OTHER PUBLICATIONS

International Search Report dated Dec. 5, 2022, for International Application No. PCT/CN2022/123555.

Notification of Grant dated Jan. 12, 2022 in connection with Application Serial No. 202111173456.4.

CN Office Action dated Nov. 15, 2021 in connection with Application Serial No. 202111173456.4.

CN Office Action dated Dec. 3, 2021 in connection with Application Serial No. 202111173456.4.

* cited by examiner

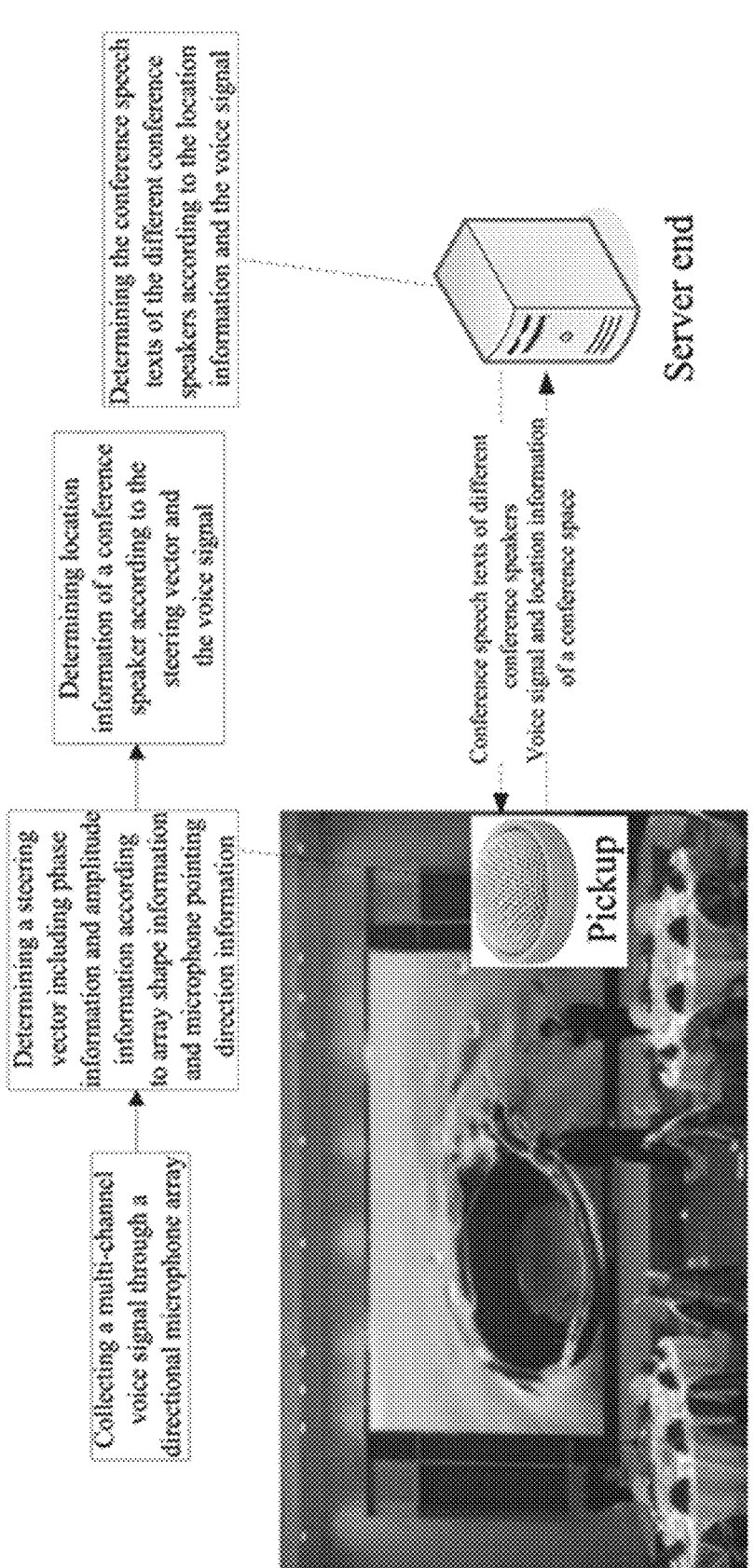

Collecting a multi-channel voice signal through a directional microphone array

Determining a steering vector including phase information and amplitude information according to array shape information and microphone pointing direction information Determining location information of a conference speaker according to the steering vector and the voice signal Determining the conference speech texts of the different conference speakers according to the location information and the voice signal Conference speech texts of different conference speakers Voice signal and location information of a conference space Pickup Server end

FIG. 4

SOUND LOCALIZATION METHOD, APPARATUS AND DEVICE

CROSS-REFERENCE TO RELATED APPLICATIONS

The present application is a National Stage of International Application No. PCT/CN2022/123555, filed on Sep. 30, 2022, which claims priority to Chinese Patent Application No. 202111173456.4, filed to China National Intellectual Property Administration on Oct. 9, 2021 and titled "SOUND LOCALIZATION METHOD, APPARATUS and DEVICE", the entire contents of these applications are incorporated herein by reference.

TECHNICAL FIELD

The present application relates to the technical field of voice processing, in particular to a conference speech presentation system, a sound localization method and apparatus, a conference system and a pickup device.

BACKGROUND

The basic function of an audio and video device in a conference scenario includes speaker tracking function. To realize the speaker tracking function, it is necessary to locate the speaker in real time. Sound Localization is to determine a spatial location of sound, and the accuracy of sound localization directly affects the accuracy of speaker tracking. A typical sound localization method is the Direction of Arrival estimation (DOA) method based on a microphone. There are two kinds of DOA methods based on a microphone: a DOA method based on an omnidirectional microphone and a DOA method based on a directional microphone array. The DOA method based on an omnidirectional microphone is greatly influenced by a reverberation, while the DOA method based on a directional microphone array has more robustness, so the DOA method based on a directional microphone array has been widely adopted. The existing DOA method based on a directional microphone array is to adopt a directional microphone array in circular, add a Weighting Function based on a Steered-Response Power (SRP) sound localization algorithm, and estimate a sound direction through using signals picked up by some microphones facing the sound.

However, in the process of implementing the present disclosure, the inventor found that the existing DOA scheme based on a directional microphone array has at least the following problems: the accuracy of sound localization is low because only signals picked up by some microphones facing the sound are utilized, and the amplitude information is not fully utilized.

SUMMARY

The present disclosure provides a sound localization method to solve the problem of low accuracy of sound localization in the prior art. The present application further provides a conference speech presentation system, a sound localization apparatus, a conference system and a pickup device.

The present application provides a conference speech presentation system, which includes:

a terminal device, configured to collect a multi-channel voice signal of a conference space through a directional microphone array; determine a steering vector including phase information and amplitude information according to array shape information and microphone pointing direction information; determine location information of a conference speaker according to the steering vector and the voice signal; send the voice signal and the location information to a server end; and present conference speech texts of different conference speakers sent back by the server end;

the server end, configured to convert the voice signal into a conference speech text through a voice recognition algorithm; and determine the conference speech texts of the different conference speakers according to the location information.

The present application further provides a sound localization method, comprising:

collecting a multi-channel voice signal through a directional microphone array;

determining a steering vector including phase information and amplitude information according to array shape information and microphone pointing direction information;

determining sound direction information according to the steering vector and the voice signal.

In an implementation, the determining a steering vector including phase information and amplitude information according to array shape information and microphone pointing direction information includes:

determining a phase difference according to the array shape information;

determining an amplitude response according to the microphone pointing direction information;

determining the steering vector according to the phase difference and the amplitude response.

In an implementation, the array includes a linear array; the array shape information includes a distance between microphones;

a microphone pointing direction includes a direction perpendicular to the array and pointing to one side.

In an implementation, the array includes a circular array:

the array shape information includes a radius of the circular array;

the microphone pointing direction is a direction of a microphone relative to a center of the circular array.

In an implementation, the determining sound direction information according to the steering vector and the voice signal includes:

determining a spatial spectrum according to the steering vector and the voice signal;

determining the sound direction information according to the spatial spectrum.

In an implementation, the determining the sound direction information according to the spatial spectrum includes:

taking a direction for which energy response data is in the forefront as a sound direction.

The present application further provides a sound localization apparatus, which includes:

a sound collecting unit, configured to collect a multi-channel voice signal through a directional microphone array;

a steering vector determining unit, configured to determine a steering vector including phase information and amplitude information according to array shape information and microphone pointing direction information;

a sound direction determining unit, configured to determine sound direction information according to the steering vector and the voice signal.

The present application further provides a conference system, which includes a sound localization apparatus and a speaker tracking apparatus.

The present application further provides a pickup device, including:

a directional microphone array;

a processor and a memory; the memory configured to store a program for implementing the mentioned method, and the device is powered and runs the program of the method through the processor.

The present application further provides a computer-readable storage medium, where an instruction is stored in the computer-readable storage medium, which, when runs on a computer, causes the computer to perform the above-mentioned various methods.

The present application further provides a computer program product including an instruction which, when runs on a computer, causes the computer to perform the above-mentioned various methods.

Compared with the prior art, the present application has the following advantages:

the sound localization method provided by the embodiment of the present application collects a multi-channel voice signal through a directional microphone array; determines a steering vector including phase information and amplitude information according to array shape information and microphone pointing direction information: determines sound direction information according to the steering vector and the voice signal. By adopting this processing mode, both the phase information and the amplitude information are considered when determining the steering vector, which can effectively improve the accuracy of sound localization.

In the conference speech presentation system provided by the embodiment of the present application, the terminal device collects a multi-channel voice signal of a conference space through a directional microphone array: determines a steering vector including phase information and amplitude information according to array shape information and microphone pointing direction information: determining location information of a conference speaker according to the steering vector and the voice signal: sends the voice signal and the location information to a server end: the server end converts the voice signal into a conference speech text through a voice recognition algorithm: determines conference speech texts of different conference speaker according to the location information: the terminal device presents the conference speech texts of the different conference speakers. By adopting this processing mode, both the phase information and the amplitude information are considered when determining the steering vector, which can effectively improve the accuracy of localization for conference speakers, and then improve the accuracy of conference speech presentation.

BRIEF DESCRIPTION OF DRAWINGS

FIG. 4 is a schematic diagram of an application scenario of an embodiment of a conference speech presentation system provided by the present application.

DESCRIPTION OF EMBODIMENTS

In the following description, numerous specific details are set forth in order to provide a thorough understanding of the present application. However, the present application can be implemented in many other ways different from those described here, and those skilled in the art can make similar promotion without violating the connotation of the present application, so the present application is not limited by the specific embodiments disclosed below.

In the present application, a conference speech presentation system, a sound localization method and apparatus, a conference system and a pickup device are provided. Various schemes are described in detail in the following embodiments.

The First Embodiment

The embodiment of the present disclosure provides a sound localization method, which can be adopted for a pickup device, an audio and video conference terminal and the like, where the device includes a directional microphone array instead of an omnidirectional microphone array.

Figure 1:
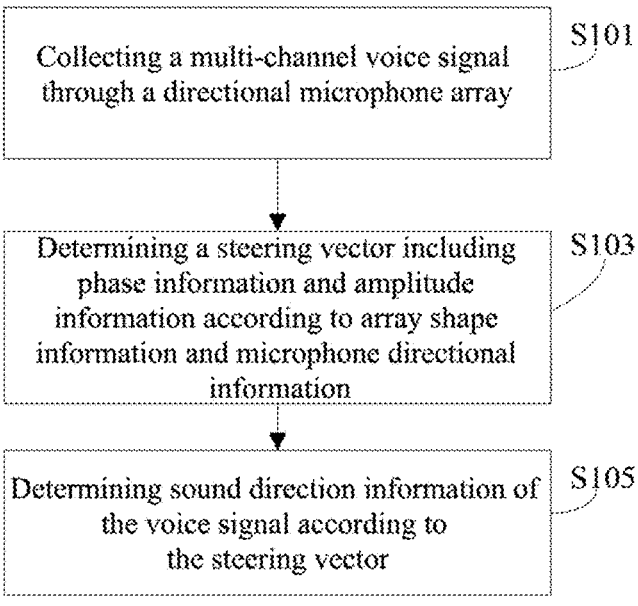
FIG. 1 is a flow diagram of an embodiment of a sound localization method provided by the present application.

Please refer to FIG. 1, which is a flow diagram of an embodiment of the sound localization method of the present application. In this embodiment, the method may include the following steps:

Step S101: collecting a multi-channel voice signal through a directional microphone array.

The directional microphone includes, but is not limited to, heart-shaped, hypercardioid, gun-shaped, and double-directional.

The microphone array can be a circular array or a linear array, or an array with other geometric shapes, such as a square array and a triangular array, or an array with irregular geometric shapes.

Step S103: determining a steering vector including phase information and amplitude information according to array shape information and microphone pointing direction information.

The processing flow of the method provided by the embodiment of the present application adopts the same processing flow as that of the DOA method based on an omnidirectional microphone in the prior art, but the determination mode of the steering vector is improved, and this step S103 is the improved determination mode of the steering vector.

In a specific implementation, the DOA localization method such as Steered-Response Power-Phase Transform (SRP-PHAT), MUSIC (Multiple Signal Classification) and MVDR (Minimum Variance Distortionless Response) can be adopted. Taking the SRP-PHAT localization method as an example, this method scans different angles (0-360 degrees), calculates energy response of each angle according to the steering vector and the signal received by the microphone array, and then obtains a spatial spectrum: after obtaining the spatial spectrum, the angle with higher energy response in the spatial spectrum can be selected as a sound localization result. The difference among these DOA methods is that the mode of calculating the spatial spectrum according to the steering vector and the multi-channel speech signal is different.

The array shape information is related to the geometric shape of the array. Taking a linear array as an example, the array shape information may include information such as a distance between microphones. Taking a circular array as an example, the array shape information may include information such as the radius of the circular array.

The microphone pointing direction information is also related to the geometric shape of the array. Take a linear array as an example, the pointing direction of the microphone is perpendicular to the array and pointing to one side. Taking a circular array as an example, the pointing direction of the microphone is the direction of the microphone relative to the center of the array.

In the prior art, when an omnidirectional microphone array is adopted, the steering vector only represents the phase relationship of an incident signal on each array element in the microphone array. In the method provided by the present application, when the microphone in the array is a directional microphone, the directivity of the microphone is also considered in the steering vector, that is, an amplitude response in the direction is to be calculated. That is to say, the steering vector described in the embodiment of the present application includes phase information and amplitude information. Therefore, for signals in different directions, both phase information and amplitude information can be adopted for localization.

In this embodiment, step S103 may include the following sub-steps: determining the phase difference according to the array shape information; determining the amplitude response according to the microphone pointing direction information; determining the steering vector according to the phase difference and the amplitude response.

Figure 2:
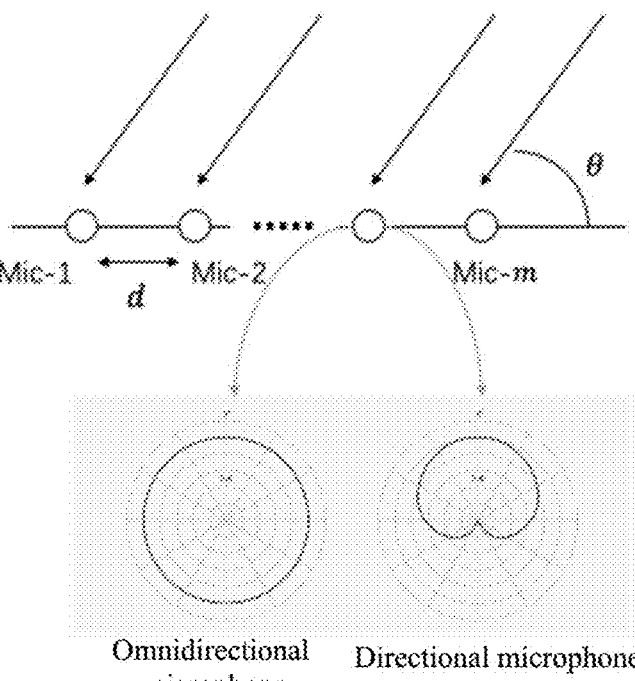
FIG. 2 is a linear array diagram of an embodiment of a sound localization method provided by the present application.

As shown in FIG. 2, in one example, Mic-1, Mic-2 . . . . Mic-m represent m directional microphones, and the directional microphone array is a linear array. The amplitude response can be calculated by the following formula:

$$p(\theta_m, \theta) = \alpha + (1 - \alpha)\cos(\theta_m - \theta)$$

In this formula, $p(\theta_m, \theta)$ represents the amplitude response of m-th directional microphone, $\theta$ represents an incident direction of a signal, $\theta_m$ represents a pointing direction of the m-th directional microphone and a represents a first-order coefficient of the directional microphone.

Accordingly, the following formula can be adopted for the steering vector:

$$v(w) = \begin{bmatrix} p(\theta_1, \theta) \\ p(\theta_2, \theta)e^{-jwd/ccos\theta} \\ \vdots \\ p(\theta_m, \theta)e^{-jw(m-1)d/ccos\theta} \end{bmatrix}$$

It can be seen from this formula that the directional microphone array includes m directional microphones, and the distance between adjacent microphones is d, and d is the array shape information; where v(w) represents the steering vector, and the steering vector includes the phase difference and the amplitude response; $p(\theta_i, \theta)$ represents the amplitude response of the i-th directional microphone in the direction of $\theta$, and $e^{-jwd/c\,\cos\theta}$ represents the phase difference of the directional microphone in the direction of $\theta$. For the first microphone, the distance difference is 0 and the phase difference is 1; for the second microphone, the distance difference is d and the phase difference is $e^{-jwd/c\,\cos\theta}$; by analogy, for the m-th microphone, the distance difference is (m−1)d and the phase difference is $e^{-jwd(m-1)d/c\,\cos\theta}$.

In the prior art, the following formula can be adopted to calculate the steering vector of directional microphone:

$$v(w) = \begin{bmatrix} 1 \\ e^{-jwd/ccos\theta} \\ \vdots \\ e^{-jw(m-1)d/ccos\theta} \end{bmatrix}$$

It can be seen from this formula that the amplitude information is not considered when calculating the steering vector in the prior art, therefore the steering vector is not accurate enough.

In another example, the directional microphone array is a circular array, and the following formula can be adopted for the steering vector:

$$v(w) = p(\theta_m, \theta)e^{j\frac{wR}{c}cos(\theta-\theta_m)}$$

In this formula, $\theta$ represents an incident direction of a signal, $\theta_m$ represents a pointing direction of the m-th directional microphone and R represents a radius of the circular array.

Step S105: determining sound direction information according to the steering vector and the voice signal.

After determining the steering vector including phase information and amplitude information, the DOA method can be adopted to determine sound direction information according to the steering vector and the voice signal.

Figure 3:
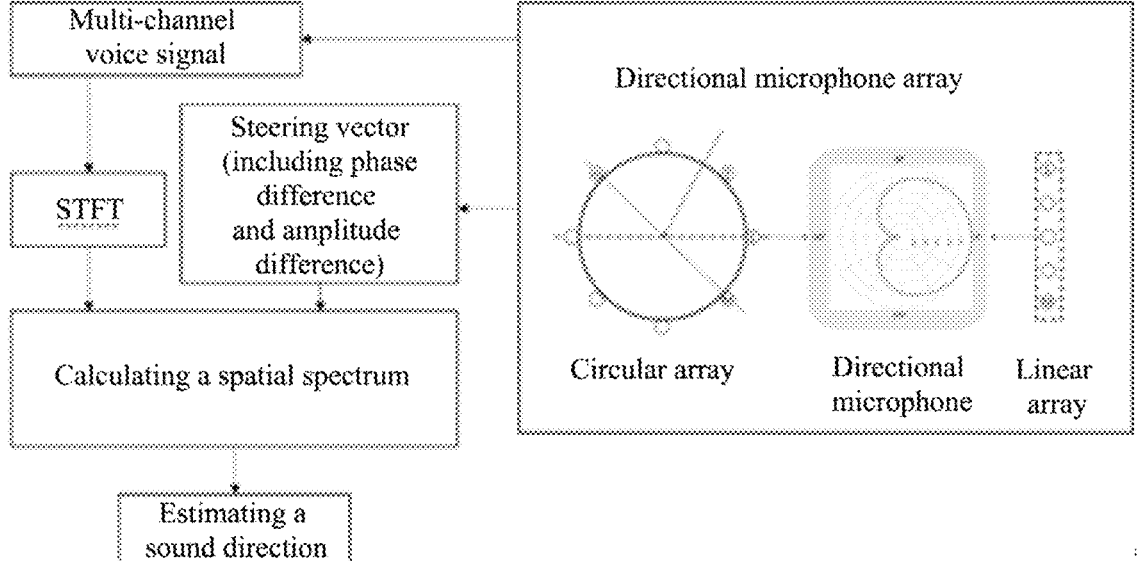
FIG. 3 is a specific flow diagram of an embodiment of a sound localization method provided by the present application.

As shown in FIG. 3, the directional microphone array may be a circular array or a linear array. Specifically, step S105 may include the following sub-steps: determining a spatial spectrum according to the steering vector and the voice signal, where the voice signal may be a voice signal processed by a Short-Time Fourier Transform (Short-Term Fourier Transform, STFT) of a multi-channel voice signal; determining the sound direction information according to the spatial spectrum. In specific implementation, after obtaining the spatial spectrum, the angle with higher energy response in the spatial spectrum can be selected as a sound localization result. As DOA methods such as SRP-PHAT, MUSIC and MVDR are relatively mature prior art, they will not be described here.

It can be seen from the above embodiment that the sound localization method provided by the embodiment of the present application collects a multi-channel voice signal through a directional microphone array: determines a steering vector including phase information and amplitude information according to array shape information and microphone pointing direction information: determines sound direction information according to the steering vector and the voice signal. By adopting this processing mode, both the phase information and the amplitude information are considered when determining the steering vector, which can effectively improve the accuracy of sound localization.

The Second Embodiment

In the above embodiment, a sound localization method is provided, and correspondingly, the present application further provides a sound localization apparatus. The apparatus corresponds to the embodiment of the above method. Since the apparatus embodiment is basically similar to the method embodiment, the description thereof is relatively simple, and the relevant points can be found in part of the description of the method embodiment. The apparatus embodiment described below is merely schematic.

The present application additionally provides a sound localization apparatus, which includes:

a sound collecting unit, configured to collect a multi-channel voice signal through a directional microphone array;

a steering vector determining unit, configured to determine a steering vector including phase information and amplitude information according to array shape information and microphone pointing direction information;

a sound direction determining unit, configured to determine sound direction information according to the steering vector and the voice signal.

In an implementation, the steering vector determining unit includes:

a phase difference determining subunit, configured to determine a phase difference according to the array shape information;

an amplitude response determining subunit, configured to determine an amplitude response according to the microphone pointing direction information;

a steering vector determining subunit, configured to determine the steering vector according to the phase difference and the amplitude response.

In an implementation, the array includes a linear array;

the array shape information includes a distance between microphones;

a microphone pointing direction includes a direction perpendicular to the array and pointing to one side.

In an implementation, the array includes a circular array:

the array shape information includes a radius of the circular array;

a microphone pointing direction is a direction of a microphone relative to the center of the circular array.

In an implementation, the sound direction determining unit includes:

a spatial spectrum determining subunit, configured to determine a spatial spectrum according to the steering vector and the voice signal;

a sound direction determining subunit, configured to determine the sound direction information according to the spatial spectrum.

In an implementation, the sound direction determining subunit is specifically configured to take a direction for which energy response data is in the forefront as a sound direction.

The Third Embodiment

Corresponding to the mentioned sound localization method, the present disclosure further provides a conference system. The parts of this embodiment that are the same as those of the first embodiment are not repeated here, which could refer to the corresponding parts in the first embodiment. A conference system provided by the present application includes a sound localization apparatus and a speaker tracking apparatus.

An audio and video conference system is a system device with which individuals or groups in two or more different places transmit sound, images and documents to each other through transmission lines and conference terminals and the like to implement instant and interactive communication, so as to realize a simultaneous conference.

The sound localization apparatus corresponds to the first embodiment, so it will not be described in detail, which could refer to the corresponding part in the first embodiment. The speaker tracking apparatus is configured to determine activity track information of the speaker according to the sound direction information output by the sound localization apparatus. Since the speaker tracking is a mature prior art, it will not be described here.

It can be seen from the above embodiment that the conference system provided by the embodiment of the present application includes a sound localization apparatus and a speaker tracking apparatus. The sound localization apparatus is configured to collect a multi-channel voice signal through a directional microphone array: determine a steering vector including phase information and amplitude information according to array shape information and microphone pointing direction information: determine sound direction information according to the steering vector and the voice signal. The speaker tracking apparatus is configured to determine activity track information of the speaker according to the sound direction information output by the sound localization apparatus. The system considers both phase information and amplitude information when determining the steering vector, so it can effectively improve the accuracy of sound localization and then improve the accuracy of speaker tracking.

The Fourth Embodiment

Corresponding to the mentioned sound localization method, the present application further provides a conference speech presentation system. The parts of this embodiment that are the same as those of the first embodiment are not repeated here, which could refer to the corresponding parts in the first embodiment. A conference system provided by the present application includes a terminal device and a server end.

Please refer to FIG. 4, which is a schematic diagram of a scenario of a conference speech presentation system provided by the present application. In this embodiment, the terminal device is deployed at a conference site, and the server end is deployed on a cloud server. In addition, a large screen can be deployed at the conference site to present a conference speech text and the corresponding speakers in real time for users to watch. The server end and the terminal device can be connected through a network, for example, the terminal device can be connected to a network through GPRS\4G\WIFI and the like. The terminal device is configured to collect a multi-channel voice signal of a conference space through a directional microphone array: determine a steering vector including phase information and amplitude information according to array shape information and microphone pointing direction information: determine location information of the conference speaker according to the steering vector and the voice signal: send the voice signal and the location information to the server end. The server end is configured to convert the voice signal into a conference speech text through a voice recognition algorithm: determine conference speech texts of different conference speakers according to the location information. The terminal device presents the conference speech text and the corresponding speaker information on the large screen.

It can be seen from the above embodiment that in the conference speech presentation system provided by the embodiment of the present application, the terminal device collects a multi-channel voice signal of a conference space through a directional microphone array: determines a steering vector including phase information and amplitude information according to array shape information and microphone pointing direction information; determines location information of a conference speaker according to the steering vector and the voice signal; sends the voice signal and the location information to a server end. The server end converts the voice signal into a conference speech text through a voice recognition algorithm; and determines conference speech texts of different conference speakers according to the location information. The terminal device presents the conference speech texts of different conference speakers. By adopting this processing mode, both the phase information and the amplitude information are considered when determining the steering vector, which can effectively improve the accuracy of localization for conference speakers, and then improve the accuracy of conference speech presentation.

Although the present application has been disclosed in terms of the preferred embodiments, it is not intended to limit the present application to these embodiments. Any person skilled in the art can make possible changes and modifications without departing from the spirit and scope of the present application, so the protection scope of the present application should be based on the scope defined in the claims of the present application.

In a typical configuration, a computing device includes one or more processors (CPU), an input/output interface, a network interface, and a memory.

The memory may include a non-permanent memory, a random access memory (RAM) and/or a nonvolatile memory and the like in computer-readable medium, such as a read-only memory (ROM) or a flash memory. The memory is an example of a computer-readable medium.

1. The computer-readable medium includes a permanent medium and a non-permanent medium, a removable medium and a non-removable medium, with which information storage can be implemented by any method or technology. Information can be a computer-readable instruction, a data structure, a module of a program or other data. An example of storage medium for a computer includes, but not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), and a digital versatile disc (DVD). Or other optical storage, a magnetic cassette, a magnetic tape/magnetic disk storage or other magnetic storage device or any other non-transmission medium, which can be configured to store information that can be accessed by a computing device. According to the definition in this specification, a computer-readable medium does not include a non-transitory computer-readable medium (transitory media), such as a modulated data signal and a carrier wave.

2. It should be understood by those skilled in the art that embodiments of the present application can be provided as a method, a system or a computer program product. Therefore, the present application can take the form of an entirely hardware embodiment, an entirely software embodiment or an embodiment combining software and hardware aspects. Moreover, the present application can take the form of a computer program product implemented on one or more computer-usable storage medium (including but not limited to disk storage, CD-ROM, optical storage, etc.) containing computer-usable program code.

The invention claimed is:

1. A conference speech presentation system, characterized by comprising:

a terminal device, configured to: collect a multi-channel voice signal of a conference space through a directional microphone array; determine a steering vector comprising phase information and amplitude information according to array shape information and microphone pointing direction information; determine location information of a conference speaker according to the steering vector and the multi-channel voice signal; send the multi-channel voice signal and the location information to a server end; and present conference speech texts of different conference speakers sent back by the server end; and the server end, configured to: convert the multi-channel voice signal into a conference speech text through a voice recognition algorithm; and determine the conference speech texts of the different conference speakers according to the location information.

2. A sound localization method, characterized by comprising:

collecting a multi-channel voice signal through a directional microphone array;

determining a steering vector comprising phase information and amplitude information according to array shape information and microphone pointing direction information; and determining sound direction information according to the steering vector and the multi-channel voice signal.

3. The method according to claim 2, characterized by, the determining a steering vector comprising phase information and amplitude information according to array shape information and microphone pointing direction information comprises:

determining a phase difference according to the array shape information;

determining an amplitude response according to the microphone pointing direction information; and determining the steering vector according to the phase difference and the amplitude response.

4. The method according to claim 2, characterized by:

the directional microphone array comprises a linear array;

the array shape information comprises a distance between microphones; and a microphone pointing direction comprises a direction perpendicular to the linear array and pointing to one side.

5. The method according to claim 2, characterized by:

the directional microphone array comprises a circular array;

the array shape information comprises a radius of the circular array; and the microphone pointing direction is a direction of a microphone relative to a center of the circular array.

6. The method according to claim 2, characterized by, the determining sound direction information according to the steering vector and the multi-channel voice signal comprises:

determining a spatial spectrum according to the steering vector and the multi-channel voice signal; and determining the sound direction information according to the spatial spectrum.

7. The method according to claim 6, characterized by,
the determining the sound direction information according to the spatial spectrum comprises:
taking a direction for which energy response data is in the forefront as a sound direction.

8. A sound localization apparatus, characterized by comprising:
at least one processor and a memory;
the memory stores a computer executable instruction; and
the at least one processor executes the computer executable instruction stored in the memory to enable the at least one processor to:
    collect a multi-channel voice signal through a directional microphone array;
    determine a steering vector comprising phase information and amplitude information according to array shape information and microphone pointing direction information; and
    determine sound direction information according to the steering vector and the multi-channel voice signal.

9. A pickup device, characterized by comprising:
a directional microphone array;
a processor; and
a memory, configured to store a computer executable instruction for implementing a sound localization method according to claim 2, and the pickup device is powered and executes the computer executable instruction through the processor.

10. A conference system, characterized by comprising:
a sound localization apparatus according to claim 8 and a speaker tracking apparatus.

11. A non-transitory computer-readable storage medium, characterized by an instruction being stored in the non-transitory computer-readable storage medium, which, when run on a computer, causes the computer to perform the method according to claim 2.

12. The pickup device according to claim 9, wherein the memory is configured to store the computer executable instruction for further implementing the following operations:
    determining a phase difference according to the array shape information;
    determining an amplitude response according to the microphone pointing direction information; and
    determining the steering vector according to the phase difference and the amplitude response.

13. The pickup device according to claim 9, wherein:
the directional microphone array comprises a linear array;
the array shape information comprises a distance between microphones; and
a microphone pointing direction comprises a direction perpendicular to the linear array and pointing to one side.

14. The pickup device according to claim 9, wherein:
the directional microphone array comprises a circular array;
the array shape information comprises a radius of the circular array; and
the microphone pointing direction information indicates a direction of a microphone relative to a center of the circular array.

15. The pickup device according to claim 9, wherein the memory is configured to store the computer executable instruction for further implementing the following operations:
    determining a spatial spectrum according to the steering vector and the multi-channel voice signal; and
    determining the sound direction information according to the spatial spectrum.

16. The pickup device according to claim 15, wherein the memory is configured to store the computer executable instruction for further implementing the following operation:
    taking a direction for which energy response data is in the forefront as a sound direction.

17. The non-transitory computer-readable storage medium according to claim 11, wherein the instruction, when run on a computer, causes the computer to further implement the following operations:
    determining a phase difference according to the array shape information;
    determining an amplitude response according to the microphone pointing direction information; and
    determining the steering vector according to the phase difference and the amplitude response.

18. The non-transitory computer-readable storage medium according to claim 11, wherein the instruction, when run on a computer, causes the computer to further implement the following operations:
    determining a spatial spectrum according to the steering vector and the multi-channel voice signal; and
    determining the sound direction information according to the spatial spectrum.

19. The non-transitory computer-readable storage medium according to claim 18, wherein the instruction, when run on a computer, causes the computer to further implement the following operation:
    taking a direction for which energy response data is in the forefront as a sound direction.

20. The sound localization apparatus according to claim 8, wherein the at least one processor is further configured to:
    determine a phase difference according to the array shape information; and
    determine an amplitude response according to the microphone pointing direction information; and
    determine the steering vector according to the phase difference and the amplitude response.

* * * * *